I. A. HEDGES.
Mills for Grinding Corn in Shuck.
No. 231,573. Patented Aug. 24, 1880.
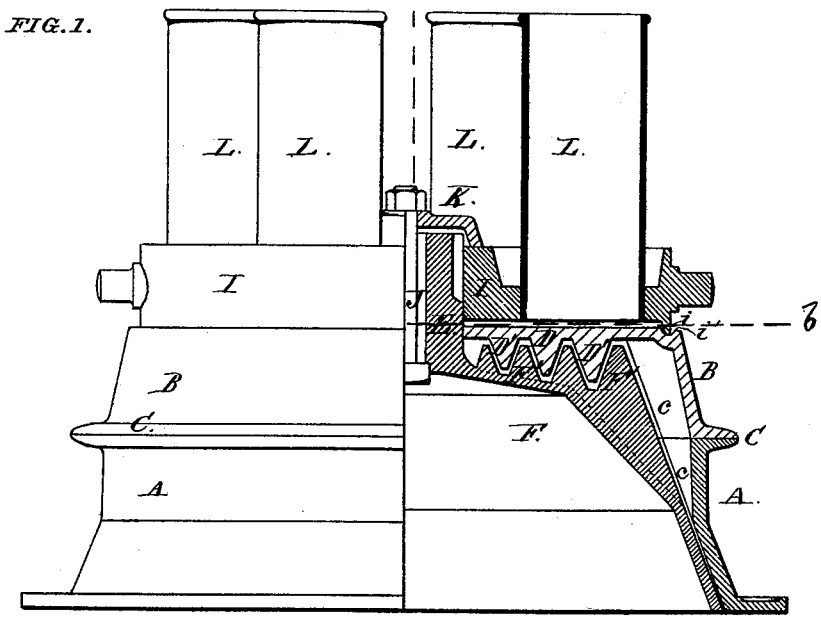
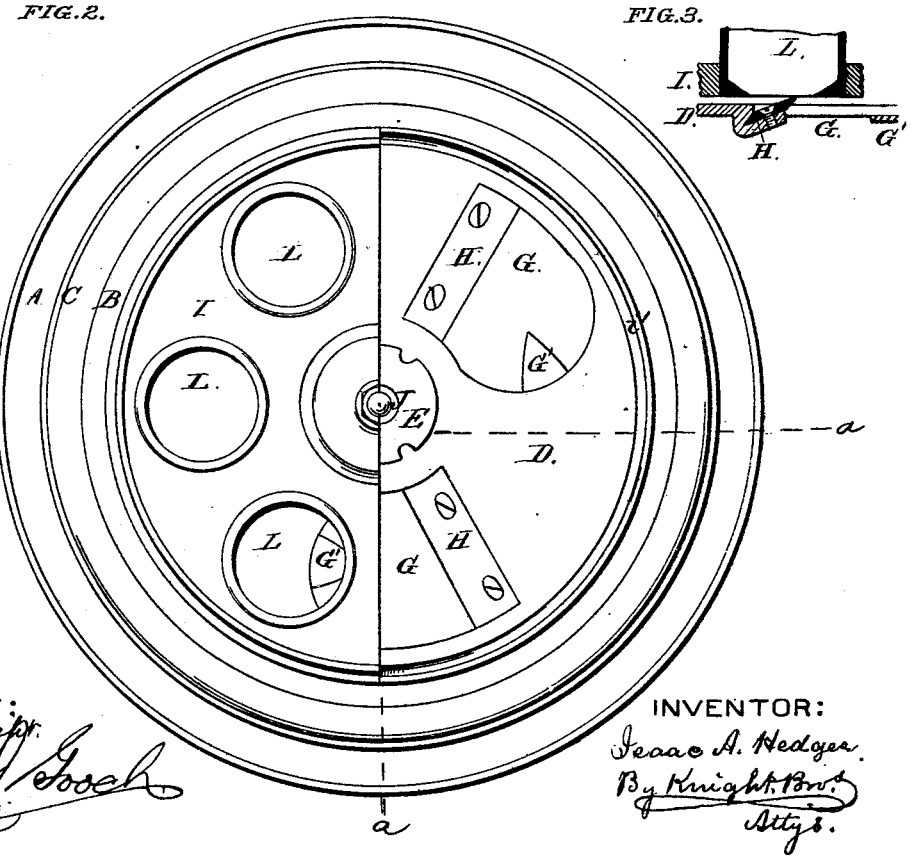
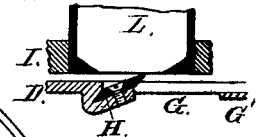
ATTEST:
Geo. H. Knight.
Chas. J. Gooch
INVENTOR:
Isaac A. Hedges.
By Knight Bros.
Attys.

UNITED STATES PATENT OFFICE.

ISAAC A. HEDGES, OF ST. LOUIS, MISSOURI.

MILL FOR GRINDING CORN IN SHUCK.

SPECIFICATION forming part of Letters Patent No. 231,573, dated August 24, 1880.

Application filed February 11, 1878.

*To all whom it may concern:*

Be it known that I, ISAAC A. HEDGES, of the city of St. Louis and State of Missouri, have invented a certain new and useful Improvement in Mills for Grinding Corn in Shuck, of which the following is a full, clear, and exact description, reference being had to the accompanying drawings, forming part of this specification.

The first part of my improvement consists in providing upon the driver a number of feed-tubes to hold the ears end downward. The lower edges of the feed-tubes are angular, and work in connection with fixed knives beneath to cut the ears and shucks transversely into slices as they enter the mill.

The second part of my improvement consists in forming a bearing-groove all around the fixed grinder or shell, near the edge, at the top, to receive a bearing-rib at the under side of the driver.

The third part of my improvement relates to the general combination of parts forming the complete mill for slicing and granulating the corn in shuck or without.

The fourth part consists in a projection to stop the descent of the ears when they reach the proper position for the cutters to act.

Figure 1 is one half in elevation and one half in vertical section upon line *a a*, Fig. 2. Fig. 2 is one half in top view and the other half in horizontal section upon line *b b*, Fig. 1. Fig. 3 is a vertical section axial to one of the hoppers and tangential to the mill.

The fixed case or outer grinder is bolted fast to a platform or box. It consists, preferably, of two annular parts, A and B, connected together by a horizontal flange-joint, C. *c c* are grinding-teeth. D is a horizontal plate, forming the top of the case A B. This plate is perforated at the center for the passage of the neck E of the inside grinder or runner F. The runner has grinding-teeth upon its conical side opposed to the teeth *c*, and has extending upward from its top teeth F′, that match between the teeth D′, pointing downward from the top plate, D, of the case A B. These teeth are coarse, and tend to coarsely mash up the slices of corn sliced off by the knives.

The plate D has a number of orifices, G—say four, more or less; and at the rear sides of the orifices are knives or cutters H, which are preferably made removable, and may be made reversible, as shown in Fig. 3. This plate D forms a cover to the chamber above the grinders, and thus prevents the husks floating up from the heavier material, and with continued grinding running over the top of the hopper.

I is the driver, which is a disk-formed piece of metal attached to the neck E of the runner. The neck extends upward through a central hole in the driver, and is connected with it by clutch-lugs. The connection between the neck E and the driver is made so free as to allow the driver to adjust itself to the peripheral guide-bearing upon the top D of the case, and to allow freedom to the runner to adjust itself centrally in the case A B.

The parts F I are held together by a screw bolt or stud, J, which extends from the neck E, through a cap, K, whose edge rests on the driver I.

L are vertical feed-tubes, which extend through the driver I, and which are large enough to allow the free passage endwise of ears of corn with the shucks on, but are not sufficiently large to allow the ears to pass through sidewise.

The lower edges of the hoppers are angular, and these edges, as the runner rotates, pass in close proximity to the knives H, so that they form shears to slice the ears and shucks transversely as the ears pass down.

G′ are projections from the forward side of the holes G. The upper surface of these projections is below the level of the knives H, so as to stop the descent of the ear of corn when it has reached the proper position for the knife to act upon it. The projection is made narrow, as shown, so as not to interfere with the descent of the parts which have been cut off.

The driver I has near the periphery an annular rib, *i*, that turns in an annular groove, *i*′, of the case A B, and this rib and groove form the oil-bearing between the driver I and case A B. This annular bearing at the periphery of the driver insures the proper relative position of the parts of the slicing device, consisting of the knives H and the lower face of the driver.

As a modification, knives H may be attached to the driver at the rear sides of the feed-tubes, and those upon the plate D dispensed with; or knives may be used upon both driver I and plate D.

As another modification the plate carrying the feed-tubes may be stationary, and the part carrying the knives be made to rotate beneath it.

I claim as my invention—

1. The combination of two or more feed-tubes, L, for feeding separate ears of corn, knives or cutting-edges H, for cutting or slicing said corn, and the outer grinder, A B, and inner grinder, F, each provided with a horizontal series of teeth and a vertical series of grinding-teeth, as explained.

2. The combination, with two or more feed-tubes, knives or cutting-edges, and outer and inner grinders, of the runner F, having upwardly-projecting teeth F', and horizontal plate D, having on its under side the teeth D', and forming a cover to the chamber above the grinders, substantially as set forth.

3. The combination of feed-tubes L in driver I, fixed knives H, attached to the plate D, and bearing $i\ i'$, substantially as and for the purpose set forth.

4. The driver I, with loose clutch-connection with the runner F by means of neck E, fitting loosely in the runner and connected therewith by adjusting-screw and clutch-lugs, to allow the vertical adjustment of the runner in the case, and the automatic central adjustment of the runner to the fixed grinder, and the driver to its bearing upon the case.

5. In combination with the tubes L, knives H, and orifice G, the stop-projection G', to arrest the downward motion of the ear, for the purpose set forth.

ISAAC A. HEDGES.

Witnesses:
SAML. KNIGHT,
GEO. H. KNIGHT.